United States Patent
Kitahara et al.

(10) Patent No.: US 8,203,267 B2
(45) Date of Patent: Jun. 19, 2012

(54) METHOD FOR MANUFACTURING HIGH-PRESSURE DISCHARGE LAMP, HIGH-PRESSURE DISCHARGE LAMP, LAMP UNIT AND PROJECTION-TYPE IMAGE DISPLAY

(75) Inventors: Yoshiki Kitahara, Osaka (JP); Katsuhiro Ono, Osaka (JP); Jun Sakaguchi, Osaka (JP); Ryo Minamihata, Kyoto (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 12/438,040

(22) PCT Filed: Jun. 8, 2007

(86) PCT No.: PCT/JP2007/061642
§ 371 (c)(1),
(2), (4) Date: Feb. 19, 2009

(87) PCT Pub. No.: WO2008/023492
PCT Pub. Date: Feb. 28, 2008

(65) Prior Publication Data
US 2010/0231872 A1    Sep. 16, 2010

(30) Foreign Application Priority Data

Aug. 23, 2006  (JP) .................................. 2006-226904

(51) Int. Cl.
*H01J 17/18*      (2006.01)
*H01J 61/36*      (2006.01)
(52) U.S. Cl. ........ 313/623; 313/634; 313/331; 313/626; 445/22; 445/26; 445/33
(58) Field of Classification Search .................. 313/631, 313/623; 445/43, 26
See application file for complete search history.

(56) References Cited

U.S. PATENT DOCUMENTS
4,851,733 A * 7/1989 Kuus et al. .................... 313/331
(Continued)

FOREIGN PATENT DOCUMENTS
JP          2-148561       6/1990
(Continued)

*Primary Examiner* — Sikha Roy
(74) *Attorney, Agent, or Firm* — Hamre, Schumann, Mueller & Larson, P.C.

(57) ABSTRACT

The present invention is directed to a method for manufacturing a high-pressure discharge lamp including: a spherical portion forming a light-emitting portion (1a); sealing portions that are connected with both ends of the spherical portion; an electrode (2a) that is sealed to each of the sealing portions; and a metal foil (3a) that is connected with a rear end of each electrode. A vessel provided with a cylindrical glass tube (8) on both ends of the spherical portion is used, a connection structure of the metal foil and the electrode are disposed in the glass tube such that a front end of the electrode is positioned in the spherical portion, and the glass tube is melted by heat and shrunk for sealing the metal foil and the electrode so as to form the sealing portion. An inner diameter $\phi$ of the glass tube before the heat-melt processing and a distance L from an edge of the metal foil to the internal space of the spherical portion are set to satisfy a relationship of $L/\phi \geq 1.35$, a corner of an edge portion of the metal foil on a side of the connection with the electrode is cut so as to form a wedge shape (7a), and subsequently the sealing step is performed. Thereby, it can suppress the generation of the breakage during the lighting life span, which is caused by a gap generated from the metal foil to an axis of the electrode during the sealing processing of the high-pressure discharge lamp having a high brightness property.

9 Claims, 9 Drawing Sheets

U.S. PATENT DOCUMENTS

| | | | |
|---|---|---|---|
| 5,109,181 A | 4/1992 | Fischer et al. | |
| 6,538,383 B1 * | 3/2003 | Takeuchi | 313/637 |
| 6,903,509 B2 * | 6/2005 | Kanzaki | 313/631 |
| 2001/0038265 A1 * | 11/2001 | Nishida | 313/631 |
| 2003/0052603 A1 | 3/2003 | Takahashi et al. | |
| 2003/0076040 A1 | 4/2003 | Kumada et al. | |
| 2004/0097163 A1 * | 5/2004 | Nishida | 445/26 |
| 2007/0013288 A1 * | 1/2007 | Tanba et al. | 313/317 |

FOREIGN PATENT DOCUMENTS

| | | | |
|---|---|---|---|
| JP | 10-255720 | | 9/1998 |
| JP | 11-111226 | | 4/1999 |
| JP | 2001-143658 | | 5/2001 |
| JP | 2001-250504 | | 9/2001 |
| JP | 2003-123696 | | 4/2003 |
| JP | 2003-157795 | | 5/2003 |
| JP | 2007280823 A | * | 10/2007 |

* cited by examiner

METHOD FOR MANUFACTURING HIGH-PRESSURE DISCHARGE LAMP, HIGH-PRESSURE DISCHARGE LAMP, LAMP UNIT AND PROJECTION-TYPE IMAGE DISPLAY

TECHNICAL FIELD

The present invention relates to a method for manufacturing a high-pressure discharge lamp that is suitable as a light source for a backlight of a projection-type image display, the high-pressure discharge lamp, a lamp unit and the projection-type image display.

BACKGROUND ART

Recently, as a backlight of a projection-type image display such as a liquid crystal projector, an overhead projector and the like, a projection-type light source (lamp unit) including a high-pressure mercury discharge lamp and a reflecting mirror in combination has been known. The high-pressure mercury discharge lamp, in which a vapor pressure of mercury during lighting rises to a range of 20 MPa to 35 MPa so as to intensify continuous light emission in a visible region, is used.

Such a discharge lamp with a high pressure during the lighting has a possibility of generating a problem of breakage during the lighting due to a slight crack existing in a light-emitting tube glass portion or structural stress concentration, because of its high pressure. In order to prevent such a breakage problem, it is suggested to improve a structure of a metal foil that is sealed inside a sealing portion so as to suppress the generation of a crack around the metal foil. For example, Patent Document 1 discloses forming an edge portion of the metal foil to have a roundly curved shape that is convex toward its outside such that the stress is not concentrated.
Patent Document 1: JP 11 (1999)-111226 A

DISCLOSURE OF INVENTION

Problem to be Solved by the Invention

A backlight to be used for a liquid crystal projector and the like is required to have high brightness as a primary condition. Thus, endeavors have been made, by decreasing a distance between electrodes to 1.5 mm or less, increasing an amount of enclosed mercury so as to increase a vapor pressure of the mercury to 150 atm or more during the lighting, and the like.

Moreover, in order to vaporize the mercury and maintain its high pressure, it is necessary to raise a temperature of a coldest portion in a light-emitting tube spherical portion. This requires a structure for making a distribution of a temperature in the light-emitting tube spherical portion as uniform as possible. For obtaining such a structure, it is desired to raise a temperature of front end portions of axial bars of electrodes that are sealed to both ends of a light-emitting tube, by decreasing buried lengths of the electrodes that are buried into glass to minimum possible.

However, the conventional high-pressure mercury discharge lamp has a possibility to generate a breakage problem during lighting due to a structure of electrode members that are sealed to both end portions of the light-emitting tube. Thus, above-identified Patent Document 1 suggests to improve the structure of the metal foil. But in a course of the design for decreasing the buried length of the electrode sealed to the sealing portion so as to increase the brightness of the lamp, it has been recognized that a sufficient breakage preventing effect cannot be obtained solely by forming the edge portion of the metal foil to have a curved shape, or by polishing an edge of the edge portion by chemical etching as suggested as other measures.

In the vessel of decreasing the buried length of the electrode, a part of the electrode axial bar to be sealed by glass melt becomes narrow. Thus, during the melt sealing, it is necessary to shrink and melt the glass for squeezing the melted glass acutely toward the narrow part. In order to melt the glass acutely, it is necessary to melt by laser that causes less thermal diffusion or seal by burner flame that is a acute as possible.

However, it was realized that a new problem occurs according to this. Even when using the glass melting means that is a acute as possible, the melted glass is in contact with the edge portion of the metal foil that is connected to the electrode at the stage of melting and shrinking the glass, and a part of the glass that is in contact with the metal foil is cooled. Thereby, the glass is not melted and shrunk completely, so as to generate a gap, and the gap remains along the edge portion of the metal foil. This gap may be extended from the edge portion of the metal foil along the axial bar of the electrode to reach a spherical portion of the light-emitting tube. As a result, an operating pressure generated during the lighting of the lamp is applied to the gap, so that a stress is concentrated, which may cause the breakage problem during the lighting.

The present invention aims to provide a method for manufacturing the high-pressure discharge lamp that has the high brightness property and can suppress the generation of the breakage during a lighting life span, which is caused by the gap generated from the metal foil to the axis of the electrode at the time of the sealing processing.

Moreover, the present invention aims to provide the high-pressure discharge lamp having a structure that can suppress the generation of the breakage caused as described above.

Means for Solving Problem

The method for manufacturing a high-pressure discharge lump of the present invention is a method for manufacturing a high-pressure discharge lamp including: a substantially spherical portion made of glass forming an internal space that is a light-emitting portion; a pair of sealing portions made of glass that are connected respectively with both ends of the substantially spherical portion; a pair of electrodes that are sealed into the respective sealing portions at rear end portions so that front ends thereof are positioned in the light-emitting portion, wherein the front ends of the respective electrodes face to each other with a predetermined electrode distance in the light-emitting portion; and metal foils that are sealed to the respective sealing portions and are connected with the rear ends of the electrodes. The method includes: using a vessel provided with a substantially cylindrical glass tube for forming the respective sealing portions on both ends of the substantially spherical portion; disposing a connected structure of the metal foil and the electrode in the glass tube such that the front end of the electrode is positioned in the light-emitting portion; and melting by heat and shrinking the glass tube for sealing the metal foil and the electrode so as to form the sealing portion.

In order to solve the above-described problems, the method for manufacturing a high-pressure discharge lump of the present invention is characterized in that an inner diameter $\phi$ of the glass tube before the heat-melt processing and a distance L from an edge of the metal foil to the internal space of the substantially spherical portion are set to satisfy a relationship of $L/\phi \geq 1.35$, a corner of an edge portion of the metal foil on a side of the connection with the electrode is cut so as to form a wedge shape, and then the sealing step is performed.

The high-pressure discharge lamp of the present invention is a high-pressure discharge lamp including: a substantially spherical portion made of glass forming an internal space that is a light-emitting portion; a pair of sealing portions made of glass that are connected respectively with both ends of the substantially spherical portion; a pair of electrodes that are sealed into the respective sealing portions at rear end portions so that front ends thereof are positioned in the light-emitting portion, wherein the front ends of the respective electrodes face to each other with a predetermined electrode distance in the light-emitting portion; and metal foils with strap shapes that are sealed to the respective sealing portions and are connected with the rear ends of the electrodes. Both corners of an edge portion of the metal foil on a side of connection with the electrode are cut so as to form a curved outline that is concave toward an inside of the strap shape and have no inflection point.

EFFECTS OF THE INVENTION

According to the present invention, it is possible to suppress the contact between the glass and the metal foil to be minimum when the glass is melted and shrunk during the sealing processing, suppress the conventionally generated gap from the metal foil to the electrode axis, achieve high brightness, and suppress the generation of the breakage problem caused by the gap during the lighting life span.

Figure 1:
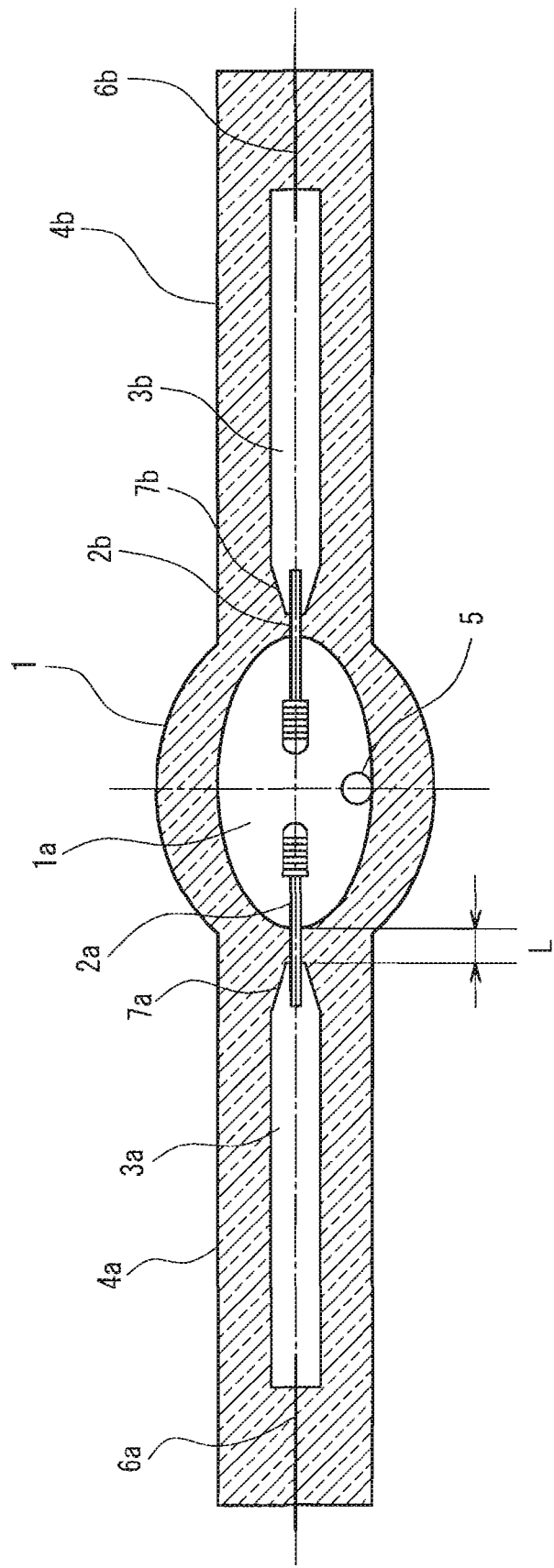
FIG. 1 is a cross-sectional view of a high-pressure mercury discharge lamp produced by a method for manufacturing a high-pressure discharge lamp according to Embodiment 1 of the present invention.

EXPLANATION OF REFERENCE CODES 1 spherical portion
1a light-emitting portion
2a, 2b electrode
3a, 3b metal foil
4a, 4b sealing portion
5 mercury
6a, 6b external conductor
7a, 7b chamfer portion
8 quartz glass tube
9 heating gas burner
10 laser
11, 12 chamfer portion
20 lamp unit
21 high-pressure discharge lamp
22 reflecting mirror
23 cement
24 base
24a concave surface portion
24b neck portion
24c attachment hole
25 reflecting film
30 front projector
31 vessel
32 optical unit
33 control unit
34 projection lens
35 cooling fan unit
36 power source unit
40 rear projector
41 vessel
42 translucent screen
$\phi$ inner diameter of quartz glass tube
L buried length of electrode 2a buried into sealing portion
A processing line (edge portion of metal foil 3a, 3b)
B processing line (boundary line between sealing portion of light-emitting portion 1a and internal space of spherical portion)
$\alpha$ angle formed by inner wall of shrunk glass tube during sealing processing with respect to line perpendicular to central axis of quartz glass tube
$\beta$ angle formed by chamfer portion obtained by cutting edge of metal foil with respect to line perpendicular to central axis

DESCRIPTION OF THE INVENTION

The present invention can adopt various embodiments based on the above-described structure, as described above.

For example, in the method for manufacturing a high-pressure discharge lamp with the above-described structure, it is preferable that the metal foil is cut at an angle within a range from 20° to 80° inclusively with respect to a line perpendicular to an axial bar of a central axis of the electrode that is sealed to the sealing portion.

Moreover, it is possible that the cutting processing is performed by mechanical cutting or superheat-melt cutting. Further, it is preferable that, after the cutting processing, the cut part is etched or polished. Also, the etching can be electrolytic etching performed in an electrolyte.

In the high-pressure discharge lamp with the above-described structure, the sealing portion is formed by shrinkage sealing processing.

Moreover, the lamp unit of the present invention is structured to include: the high-pressure discharge lamp with the above-described structure; and a reflecting mirror having a concave reflecting surface, wherein the high-pressure discharge lamp is attached to the reflecting mirror such that light emitted by the high-pressure discharge lamp is reflected by the reflecting surface.

Moreover, the projection-type image display of the present invention includes: the high-pressure discharge lamp with the above-described structure; an optical unit that forms an optical image by modulating illumination light from the high-pressure discharge lamp; and a projection apparatus that enlarges and projects the optical image.

Hereinafter, the respective embodiments of the present invention will be described in detail with reference to the drawings.

Embodiment 1

A method for manufacturing a high-pressure discharge lamp according to Embodiment 1 of the present invention will be described with reference to FIGS. 1 to 3 and 4A to 4C.

FIG. 1 is a cross-sectional view showing the high-pressure discharge lamp produced by the manufacturing method of the present embodiment. This high-pressure discharge lamp includes: a substantially spherical portion 1; and sealing portions 4a, 4b that are connected with both ends of the substantially spherical portion 1. The substantially spherical portion 1 and the sealing portions 4a, 4b are made of quartz glass. For example, in the vessel of using a high-pressure mercury discharge lamp that requires electric power of 130 W for lighting, the sealing portions 4a, 4b have a cylindrical shape with a thickness of 2.0 mm before being processed by heat-melt sealing, whose cylindrical portion has an inner diameter $\phi$ (mm) of 2.0 mm.

Inside the substantially spherical portion 1, an internal space that is a light-emitting portion 1a is formed, and in the sealing portions 4a, 4b, metal foils 3a, 3b made of molybdenum that are connected with the electrodes 2a, 2b are sealed airtightly in the sealing portions 4a, 4b, respectively, such that the electrodes 2a, 2b are positioned in the light-emitting part 1a. Both one ends of the external conductors 6a, 6b are connected to the metal foils 3a, 3b, respectively, and the other ends of the external conductors 6a, 6b are led to the outsides of the sealing portions 4a, 4b, respectively.

In the light-emitting portion 1a, one pair of the electrodes 2a, 2b made of tungsten are provided to have an electrode distance of 1.0 mm. Each of the electrodes 2a, 2b is constituted of an axial bar and a coil provided on a front end of the axial bar, and the electrode distance is a distance between the tips of the coils. The axial bars of the electrodes 2a, 2b have a diameter of 0.4 mm, and are connected with edges of one pair of the metal foils 3a, 3b made of molybdenum, respectively. A buried length L of the electrodes 2a, 2b that respectively are buried into the sealing portions 4a, 4b, in other words, a distance from the respective edges of the metal foils 3a, 3b to the respective positions where the axial bars of the electrodes 2a, 2b reach the space of the light-emitting portion 1a, is 2.3 mm. A relationship between the buried length L and the inner diameter $\phi$ of the cylindrical glass tube before the sealing portions 4a, 4b are subjected to the heat-melt processing satisfies $L/\phi \geq 1.3$. For example, it is set to satisfy the relationship of $L/\phi = 1.15$.

The metal foils 3a, 3b have strap shapes as a whole, and corners of their edge portions are cut by a cutter or the like so as to form an angle of about 70° with respect to the line perpendicular to the central axis before the electrodes 2a, 2b are connected, thereby forming chamfer portions 7a, 7b. The metal foils 3a, 3b having the chamfer portions 7a, 7b formed by the cutting are subjected to electrolytic etching in a sodium hydroxide solution of about 2% to 5%, so that burrs at the edge portions generated during the cutting are removed, thereby forming wedge shapes. The wedge shapes enable suppression of the generation of cracks by the burrs at the edge portions of the metal foils 3a, 3b during the sealing processing, and so suppress breakages caused by the cracks. After the above-described processing, the electrodes 2a, 2b are connected with the metal foils 3a, 3b by spot welding.

Incidentally, mercury 5 is sealed into the substantially spherical portion 1 at a density of about 150 mg/cm$^3$ to about 250 mg/cm$^3$, and an operating pressure during the lighting ranges about 150 atm to about 250 atm. As a rare gas for initiation, an argon gas is sealed at a density of 200 hPa, and bromine is sealed at a density of about $1 \times 10^{-7}$ mol/cm$^3$.

Next, a state of sealing processing of the high-pressure mercury discharge lamp of the present embodiment (hereinafter, called a product of the present invention) will be described by comparing the state of sealing processing of the conventional high-pressure mercury discharge lamp (hereinafter, called a conventional product) with reference to the drawings.

Figure 2:
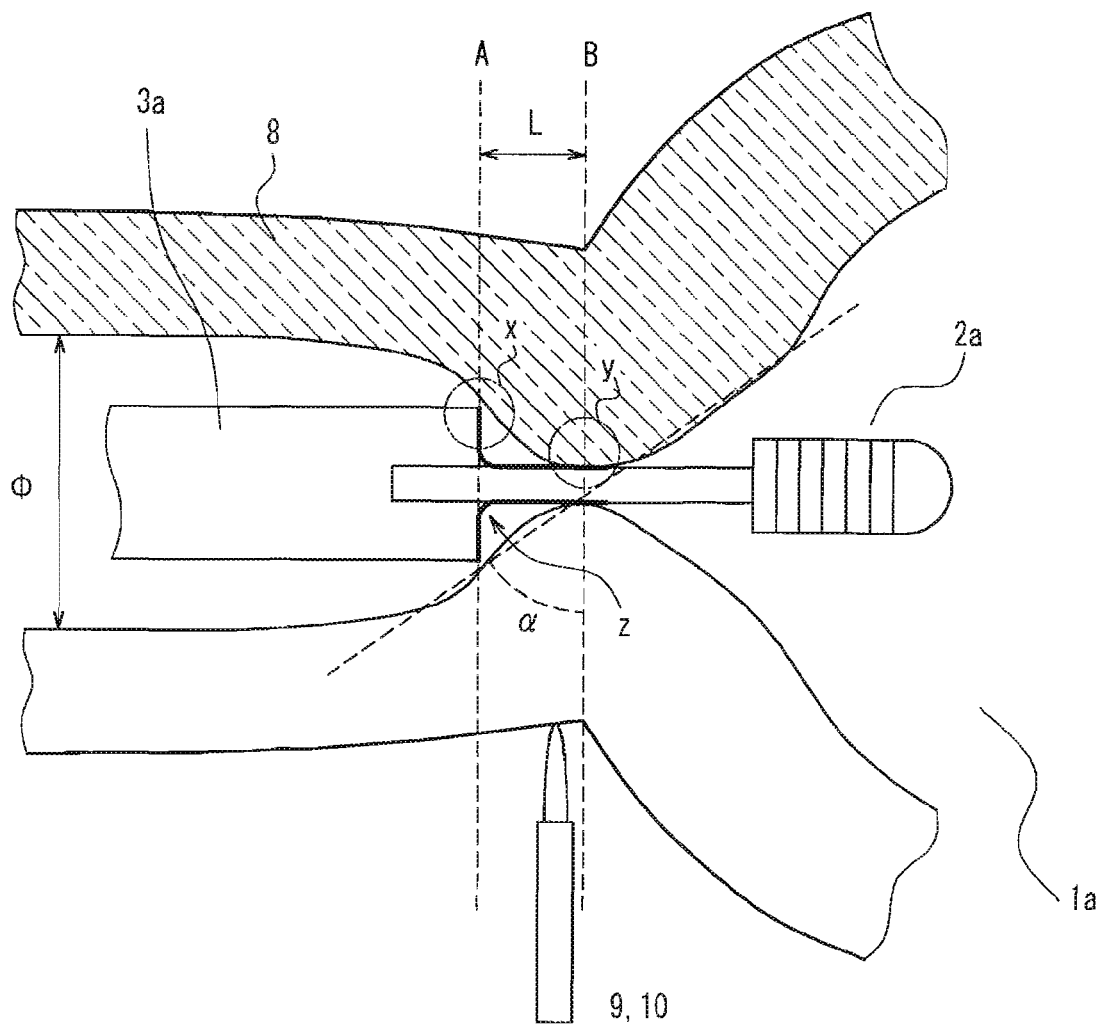
FIG. 2 is a cross-sectional view showing a state of sealing processing in the vessel of a high-pressure discharge lamp with a conventional structure.

Firstly, the sealing processing of the conventional product is shown in FIG. 2. FIG. 2 illustrates a quartz glass tube 8 having a substantially cylindrical shape in the vicinity of a connected part of the electrode 2a and the metal foil 3a, before completing the heat-melt processing. The quartz glass tube 8 connected to each of both ends of the substantially spherical portion 1 has a thickness of 2.0 mm and an inner diameter of 2.0 mm. In order to seal the electrode 2a and the metal foil 3a connected with the electrode 2a, the quartz glass tube 8 is heated and irradiated with a flame of a gas burner that uses a mixed gas containing oxygen and hydrogen or propane, or with a laser, whereby the quartz glass is melted so as to be processed by the shrinkage sealing.

Generally, the gas burner 9 or laser 10 starts the irradiation processing from a position between a processing line A and a processing line B. The processing line is estimated to be positioned from the edge portion of the metal foil 3a to a boundary line between the quartz glass tube 8 (sealing portions 4a, 4b) and the substantially spherical portion 1. During the heat shrinkage sealing, in the vessel where the length L of the part where the axial bar of the electrode 2a is sealed into the quartz glass tube 8 is sufficient with respect to the inner diameter $\phi$, the quartz glass tube 8 is shrunk so as to be in contact with a part (y) on the axial bar of the electrode 2a, thereby sealing the electrode 2a and sealing the metal foil 3a.

However, in the vessel where the length L does not have a margin with respect to the inner diameter $\phi$, the quartz glass tube 8 is in contact firstly with an edge (x) of the metal foil 3a when the quartz glass tube 8 is shrunk. Thus, the glass of the part being in contact with the metal foil 3a is cooled, so that the quartz glass tube 8 is not melt and shrunk completely, thereby generating a gap (z). Then, the generated gap (z) remains being along with the edge portion of the metal foil 3a. This gap (z) is extended from the edge portion of the metal foil 3a so as to be along with the axial bar of the electrode, and reaches the substantially spherical portion 1 of the high-pressure discharge lamp. As a result, the operating pressure during the lighting of the lamp is applied to the part of the gap (z) so as to generate stress concentration, which may cause the breakage problem during the lighting.

In order to prevent the contact of the melted glass with the edge (x) of the metal foil 3a as far as possible, the flame of the heating gas burner 9 is adjusted to have an angle that is a acute as possible so as to heat the quartz glass tube 8 locally. Alternatively, the quartz glass tube 8 is irradiated with the laser 10 that causes less thermal diffusion and is capable of local heating. Thereby, when α is defined as an angle formed by the inner wall of the quartz glass tube 8 that is melt and shrunk to be close to the electrode 2a with respect to the line perpendicular to the central axis of the quartz glass tube 8, it is possible to adjust the glass processing so that the inner wall of the quartz glass tube 8 is shrunk at the angle α within a range of 20° to 30° so as to be in contact with the part (y) on the axial bar of the electrode 2a at first. However, if the length L is small, the processing becomes extremely difficult, and a gap (z) is generated due to slight unevenness of the processing and unevenness of materials of the quartz glass tube 8.

With respect to the inner diameter φ of 2 mm, a sealing experiment was repeated while varying the length L of the part of the axial bar of the electrode 2a to be sealed with the quartz glass tube 8, thereby obtaining the following results. In the vessel where the length L was 2.8 mm or more, the gap (z) was generated 0 to 1 time with respect to n of 1000, which means a generating rate of 0% to 0.1%. On the other hand, in the vessel where the length L was 2.7 mm, the gap (z) was generated 1 to 5 times with respect to n of 1000, which means that the generating rate started to be increased to 0.1% to 0.5%. In the vessel where the length L was 2.5 mm, the gap (z) was generated 3 to 8 times with respect to n of 1000, and in the vessel where the length L was 2.3 mm, the gap (z) was generated 10 or more times with respect to n of 1000, which means the generating rate of 1% or more.

Figure 3:
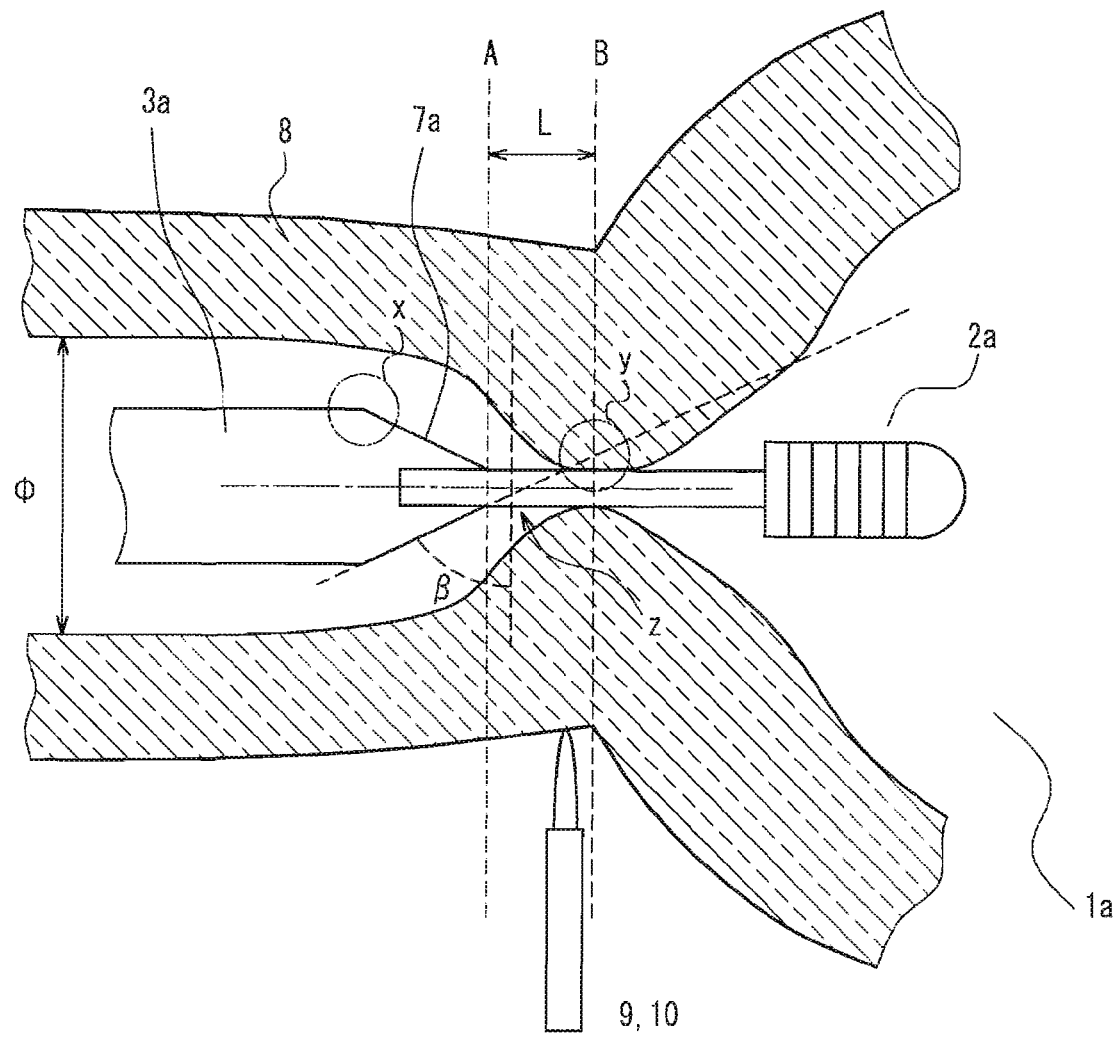
FIG. 3 is a cross-sectional view showing a state of sealing processing in the vessel of the high-pressure discharge lamp according to Embodiment 1 of the present invention.

Next, a state of the sealing processing of the product of the present invention is illustrated in FIG. 3. In the structure of the product of the present invention, the corner of the edge portion of the metal foil 3a was cut by a cutter before the electrode was connected such that the angle β with respect to the line perpendicular to the central axis ranged from 20° to 80°, thereby forming the chamfer portion 7a. The metal foil 3a whose corner was cut was subjected to electrolytic etching in a sodium hydroxide solution of about 2% to 5%, so that the burrs at the edge portion generated at the time of the cutting were removed. After this processing, the electrode 2a is connected with the metal foil 3a by spot welding.

In the sealing processing of the product of the present invention, since the edge portion of the metal foil 3a is cut off, it is possible to suppress the contact of the melted glass with the edge of the metal foil 3a when the quartz glass tube 8 is melted and shrunk by heat. Thereby, the adjustment of the glass processing for allowing the melted glass to be in contact firstly with the part (y) on the axial bar of the electrode 2a becomes quite easy. As a result, after the axial bar of the electrode 2a is sealed sufficiently, then the metal foil 3a is sealed, so that the gap (z) is not likely to be generated.

The sealing processing of the product of the present invention achieved a significant effect in which the gap (z) was not generated with respect to n of 1000 in the vessel where the length L was 2.7 mm, and the gap (z) was not generated with respect to n of 1000 even in the vessel where the length L was 2.3 mm. Further, the gap (z) was not generated with respect to n of 1000 even in the vessel where the length L was 2.0 mm, and the gap (z) was generated 0 to 3 times with respect to n of 1000 in the vessel where the length L was 1.5 mm, which shows that the generation of the gap (z) could be suppressed in most vessels.

Thus, it was proved that, in the vessel where the length L is 2.7 mm or less with respect to 2 mm of the inner diameter φ of the quartz glass tube 8 at the sealing portion, that is, a relationship L/φ≧1.35 is satisfied, the cutting of the edge portions of the metal foils 3a, 3b at the angle of 20° to 80° with respect to the line perpendicular to the central axis provides a significant effect for suppressing the generation of the gap (z).

Figure 4A:
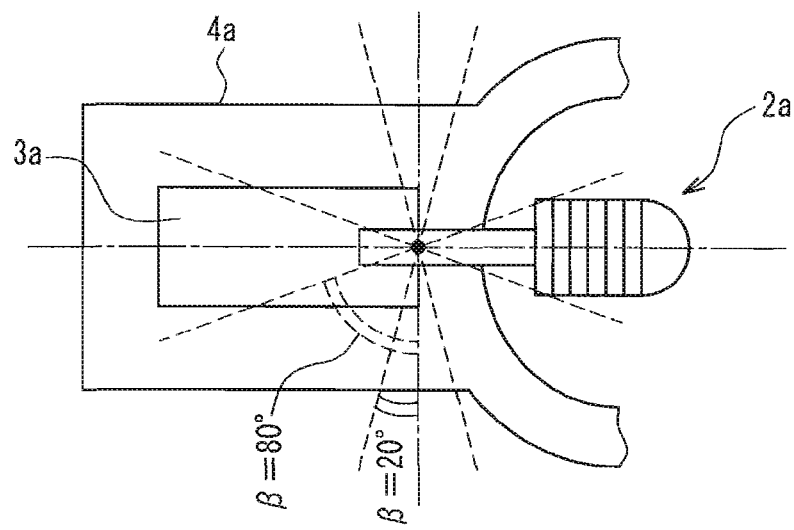
FIG. 4A is a view showing an example of a cutting angle of a metal foil constituting the high-pressure discharge lamp.
Figure 4B:
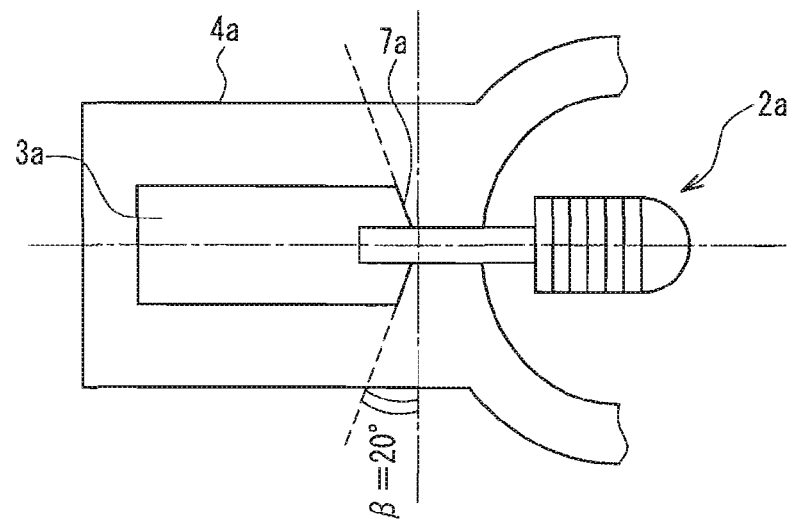
FIG. 4B is a view showing an example of the cutting angle of the metal foil constituting the high-pressure discharge lamp.
Figure 4C:
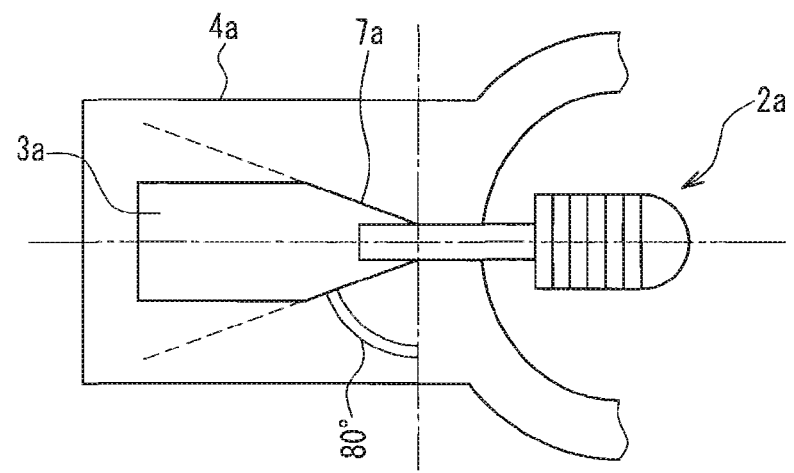
FIG. 4C is a view showing an example of the cutting angle of the metal foil constituting the high-pressure discharge lamp.

In the above description, the angle β for cutting the edge portions of the metal foils 3a, 3b with respect to the line perpendicular to the central axis was set within a range from 20° to 80° (see FIG. 4A). By the adjustment of the heating burner or the laser, it is possible to perform the processing that can suppress the generation of the gap (z) when the angle β is 20° or more as illustrated in FIG. 4B, and the sealing can be achieved without any problem when the angle β is within a range from 20° to 80°. Even when the angle is more than 80° as shown in FIG. 4C, the processing for suppressing the generation of the gap (z) is possible, but since lengths of the cut cross sections become long, the cutting of the metal foils 3a, 3b becomes difficult.

Moreover, the metal foils 3a, 3b may be cut by either scissors or a cutter, but returns are generated on the cut cross sections at the time of the cutting, so that cracks are likely to be generated due to the returns if using them as it is. Thus, it is preferable to remove the returns by electrolytic etching. Also, the cutting may be performed by laser, and if using laser, such returns are not generated particularly, and thus the electrolytic etching is not necessary. However, since the cut cross sections are slightly rough, the electrolytic etching preferably is performed.

The lamps as the conventional product and the product of the present invention satisfying L/φ=1.35, in which mercury was sealed at a density of 270 mg/cm$^3$ and the operating pressure during the lighting was about 270 atm, were manufactured for examples, and experiments were performed by lighting the 1000 (n) lamps for 100 hours. 1 to 3 of the conventional products were broken at an initial stage of the lighting, but on the other hand, no product of the present invention was broken. Similarly, the lamps as the conventional product and the product of the present invention satisfying L/φ=0.75 were manufactured for examples, and experiments were performed by lighting the 1000 (n) lamps for 100 hours. 20 of the conventional products were broken at the initial stage of the lighting, but no product of the present invention was broken.

Moreover, lighting life spans were tested with respect to 10 lamps for each of the products of the present invention that respectively satisfied L/φ=1.35 and 0.75. As a result, the high-pressure mercury discharge lamps as the products of the present invention were observed to generate slight swells at the light-emitting portions thereof when 3000 hours elapsed, but no breakage was generated, whereby it was confirmed that reliability against the breakage can be kept during the life spans. Moreover, even after 3000 hours elapsed, it was found that almost no blackening was generated. This is considered to be due to the condition that because of the decrease in the glass buried length L of the electrodes that are sealed into the both ends of the light-emitting portions to minimum possible, temperatures of the front end portions of the axial bars of the electrodes were increased, and so the temperature distribution in the sphere of the light-emitting portion was made more uniformly, whereby a halogen cycle for preventing the blacking during the life span could be stabilized at the same time.

The method for manufacturing a high-pressure discharge lamp of the present embodiment can provide the similar effect, not only in the vessel of manufacturing the high-pressure mercury lamp in the above-described example, but also in the vessel of other high-pressure discharge lamp such as a metal halide lamp, for example. Also, the similar effect can be obtained in either of the vessels using the lighting method such as high-frequency lighting, AC lighting and DC lighting.

Embodiment 2

A high-pressure discharge lamp according to Embodiment 2 of the present invention will be described with reference to FIGS. 5 and 6.

The high-pressure discharge lamp of the present embodiment is basically similar to the high-pressure discharge lamp described in Embodiment 1, and has the structure illustrated in FIG. 1. Embodiment 1 has provided the vessel where the shapes of the chamfer portions obtained by cutting the edge portions of the metal foils 3a, 3b are linear, but the present embodiment provides the vessel where the chamfer portions have different shapes.

Not only when the shapes of the chamfer portions are linear, but also when the edge portions of the metal foils 3a, 3b are cut at an angle within a range from 20° to 80° with respect to the line perpendicular to the central axis, the similar effect can be obtained even with different shapes. That is, a chamfer portion 11 with a curved line as shown in FIG. 5 and a chamfer portion 12 that is cut to have stages as shown in FIG. 6 also can obtain the effect similar to that of Embodiment 1.

Figure 5:
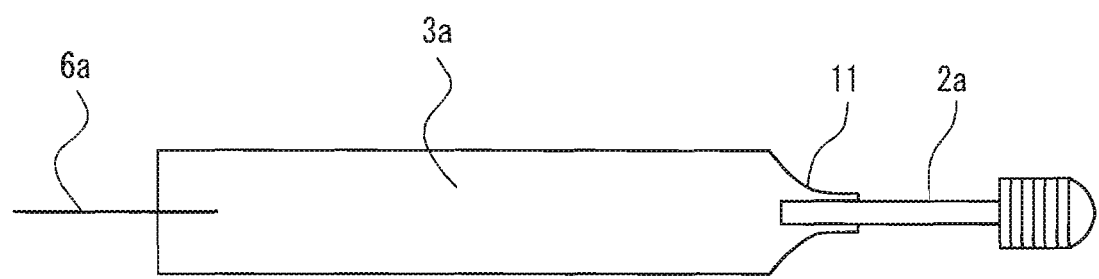
FIG. 5 is a plan view showing an example of a cutting shape of a metal foil constituting a high-pressure discharge lamp according to Embodiment 2 of the present invention.
Figure 6:
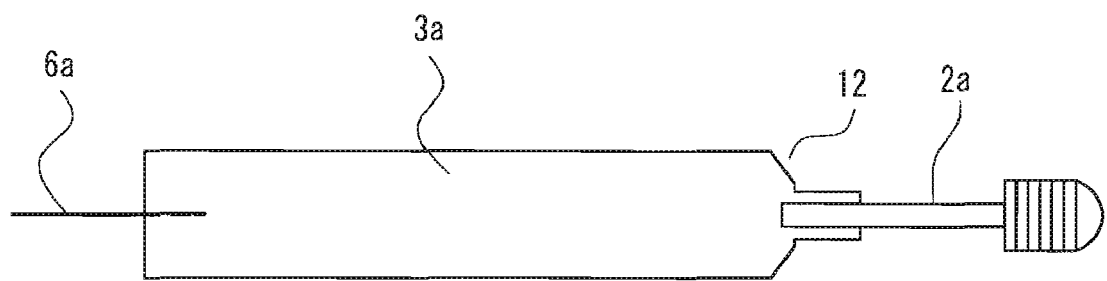
FIG. 6 is a plan view showing another example of the cutting shape of the metal foil.

In particular, the chamfer portion 11 with the concave curved line as shown in FIG. 5 has a large effect of decreasing the possibility that, when the quartz glass tube 8 (see FIG. 3) at the sealing portion is melted and shrunk by heat during the shrinkage sealing processing, the quartz glass tube 8 is in contact with the corner of the metal foil 3a. The reason for this is as follows. When the quartz glass tube 8 is shrunk, it forms a curved shape that is convex toward the metal foil 3a side so as to approach the metal foil 3a. In the vessel of the chamfer portion 11 with the concave curved line, since it has a shape similar to the convex shape of the quartz glass, a time until the quartz glass becomes in contact with the metal foil 3a is long. The shrinkage sealing processing can proceed easily such that the quartz glass tube 8 becomes in contact firstly with the axial bar of the electrode 2a so as to seal the electrode 2a, and then further becomes in contact with the metal foil 3a so as to seal the metal foil 3a.

In order to obtain such an effect more reliably, the chamfer portion 11 has a curved outline that is concave toward an inside of the strap shape of the metal foil 3a and has no inflection point. If there is an inflection point, a burr is likely to remain when etching the metal foil in advance. Moreover, if there is an inflection point, the sealing portion is likely to be distorted.

The curved shape of the chamfer portion 11 can be any curved line such as an arc, a part of an ellipse, a part of a hyperbola, a part of a parabola and the like, as long as it is concave toward the inside of the metal foil, being inner relative to the outline of the linear chamfer portion.

The chamfer portion 11 with the above-described curved shape can be processed easily by using a punch or a die having a predetermine shape. In particular, in the vessel where the curved line of the chamfer portion 11 is an inverse-R arc, it is possible to select from commercially available cylindrical punches and dies, thereby saving the processing cost.

Embodiment 3

Figure 7:
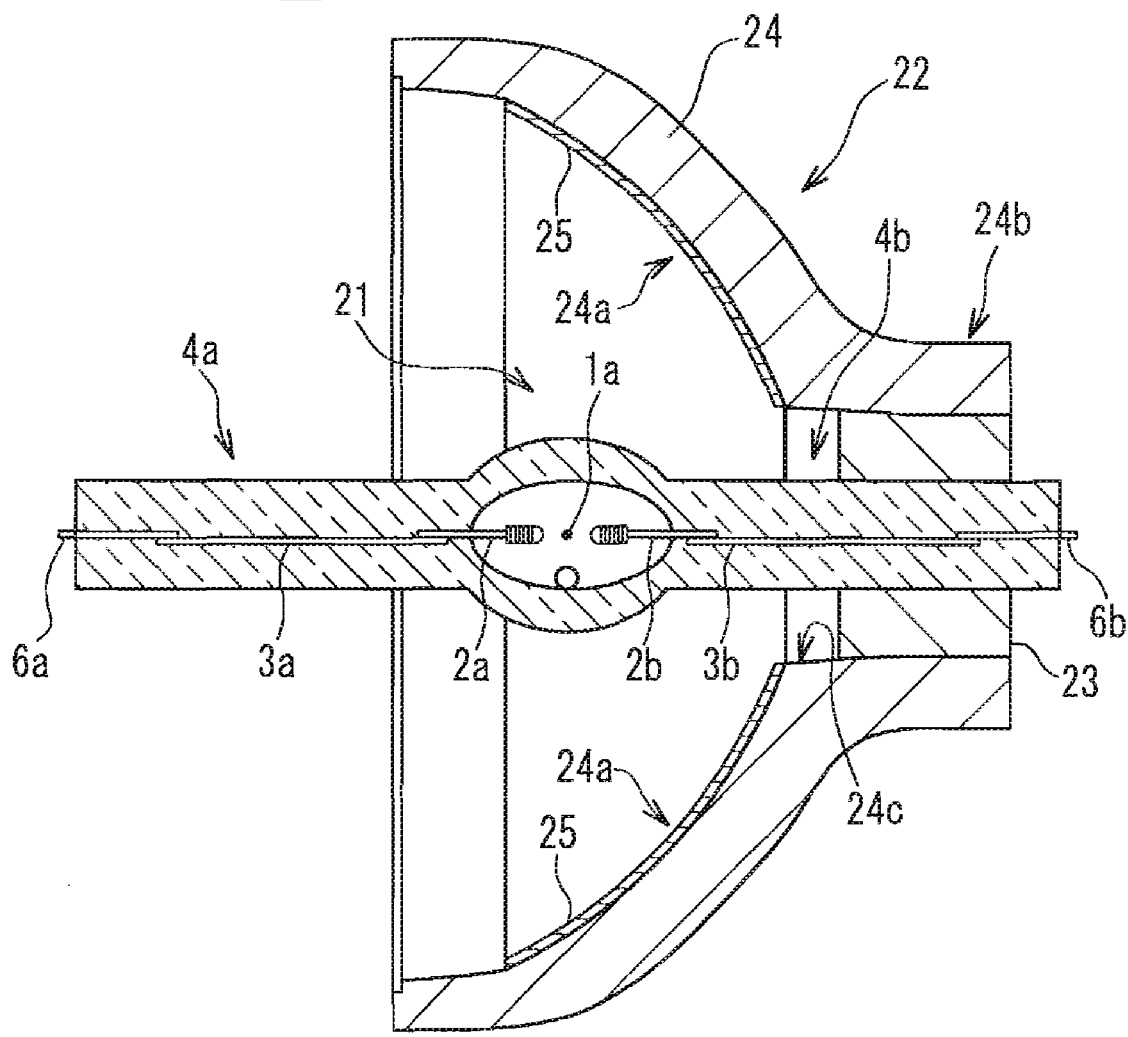
FIG. 7 is a cross-sectional view showing a lamp unit according to Embodiment 3 of the present invention.

A lamp unit 20 according to Embodiment 3 of the present invention will be described with reference to FIG. 7. FIG. 7 is a longitudinal cross-sectional view showing a schematic structure of the lamp unit 20. A high-pressure discharge lamp 21 constituting the lamp unit 20 is the high-pressure discharge lamp according to the embodiments described above.

The lamp unit 20 is provided with the high-pressure discharge lamp 21 and a reflecting mirror 22 that reflects and gathers light emitted by the high-pressure discharge lamp 21. As the reflecting mirror 22, for example, a spheroidal mirror can be used. The high-pressure discharge lamp 21 is fixed to the reflecting mirror 22 at a sealing portion 4b by cement 23.

The reflecting mirror 22 has a hard glass base 24 having a funnel shape. On a concave surface portion 24a that is formed on the spheroidal mirror on the base 24, a reflecting film 25 made of a multilayer interference film is deposited by evaporation. An opening diameter of the reflecting mirror 22 is, for example, 50 mm.

After inserting the sealing portion 4b into an attachment hole 24c made in the neck portion 24b of the base 24 and positioning the high-pressure discharge lamp 21 at a predetermined position in an axial direction of the reflecting mirror 22, the high-pressure discharge lamp 21 is fixed by the cement 23. The predetermined position ideally is a position where a designed first focal point of the reflecting mirror 22 coincides with a designed optical center (central point between the respective edges of both of the electrodes 2a, 2b) of the high-pressure discharge lamp 10. However, there actually are some vessels where a shape of a reflecting surface of the reflecting mirror 22 is uneven or axes of the electrodes 2a, 2b are deviated. More specifically, when lighting the high-pressure discharge lamp 21 for trial and shifting it in lateral and vertical directions on the sheet of FIG. 7 and in a direction perpendicular to the sheet thereof, the high-pressure discharge lamp 21 is positioned at a position for providing the maximum illuminance on a front side of the reflecting mirror 22. Thus, in the state where the high-pressure discharge lamp 21 is combined with the reflecting mirror 22, the first focal point of the reflecting mirror 22 does not necessarily coincide with the optical center perfectly.

In the lamp unit 20 with the above-described structure, when lighting the high-pressure discharge lamp 21, the light emitted from the optical axis toward the reflecting mirror 22 is reflected by the reflecting film 25 and is gathered to a second focal point of the reflecting mirror 22. Needless to say, the second focal point exists on a front side of the reflecting mirror 22 and on the axis of the reflecting mirror 22.

In the above description, the vessel of using the spheroidal mirror as the reflecting mirror 22 was discussed, but the reflecting mirror 22 is not limited to this, and also may be a rotational parabolic mirror and a concave surface (spherical surface) mirror.

Embodiment 4

A projection-type image display according to Embodiment 4 of the present invention will be described with reference to FIGS. 8 and 9.

Figure 8:
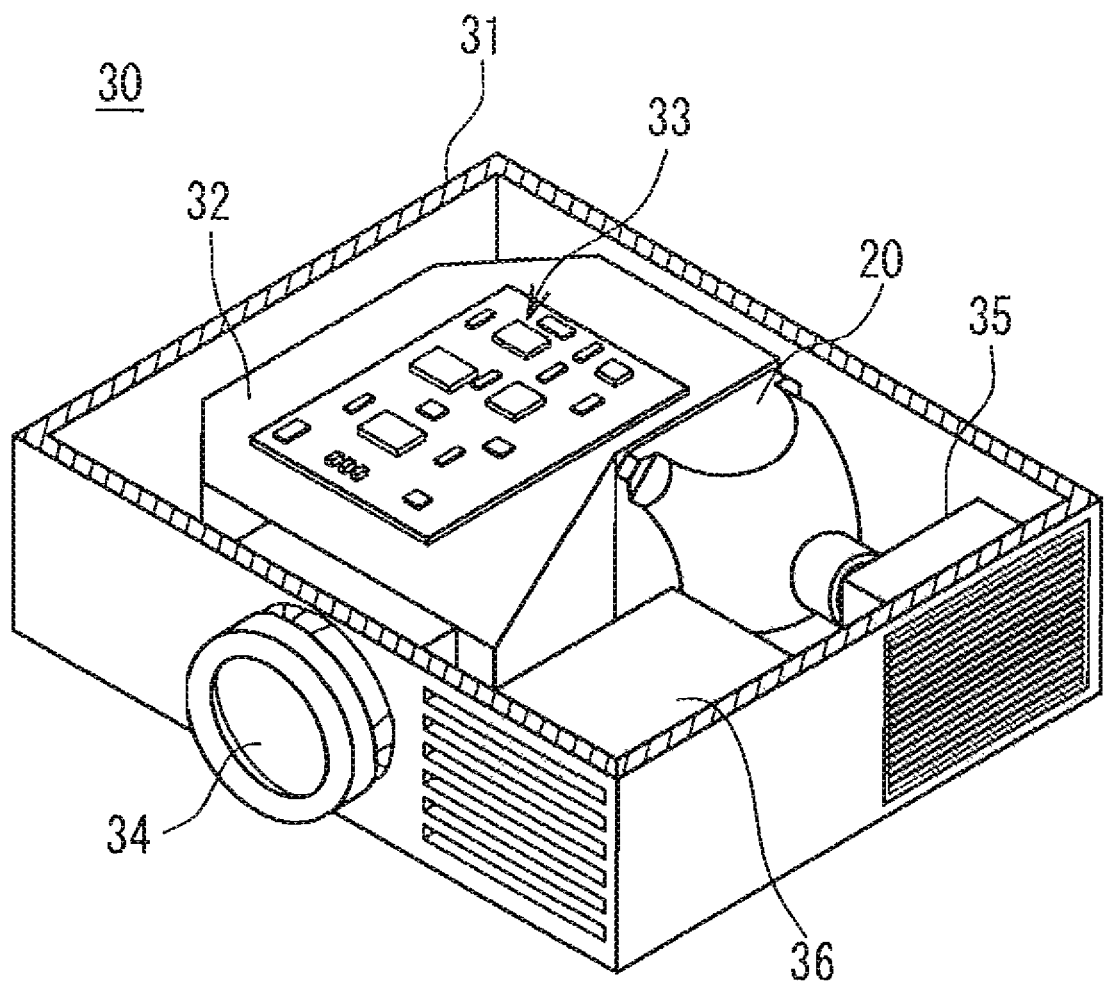
FIG. 8 is a perspective view showing a front projector according to Embodiment 4 of the present invention.

FIG. 8 shows a schematic structure of a front projector 30 as an example of the projection-type image display in which the lamp unit 20 according to Embodiment 3 is used. FIG. 8 shows a state where a top of a vessel 31 is removed. The front projector 30 is of a type for projecting an image toward a screen (not illustrated) that is provided on a front side of the projector 30.

The front projector 30 is constituted of a lamp unit 20 as a light source, an optical unit 32, a control unit 33, a projection lens 34, a cooling fan unit 35, a power source unit 36 and the like, which are stored in the vessel.

The optical unit 32 has an image formation unit that modulates incident light so as to form an image, and an illumination unit for irradiating the image formation unit (none of them is illustrated) with illumination light from the lamp unit 20. The illumination unit has a color wheel or the like (not illustrated) constituted of color filters in three colors, thereby decomposing the illumination light into the three primary colors so as to irradiate the image formation unit with them.

The control unit 33 drives and controls the image formation unit and the like. The projection lens 34 enlarges and projects an optical image that is formed by modulation by the image formation unit. The power source unit 36 converts electric power that is supplied from a commercial power supply into electric power that is appropriate for the control unit 33 and the lamp unit 20, and supplies the electric power to the control unit 33 and the lamp unit 20, respectively.

Figure 9:
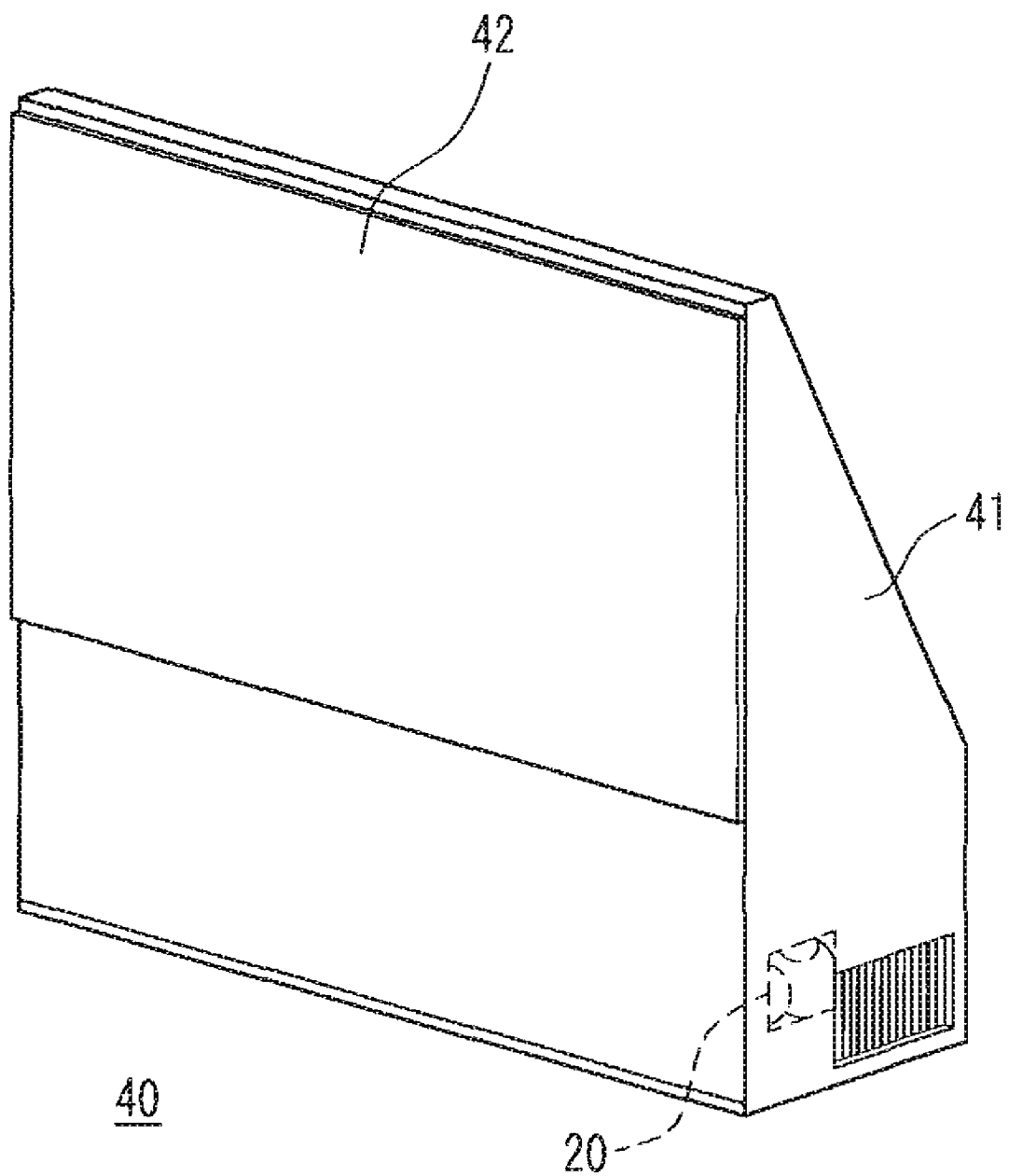
FIG. 9 is perspective view showing a rear projector according to Embodiment 4 of the present invention.

Moreover, the lamp unit 20 also can be used as a light source of a rear projector 40 that is an example of the projection-type image display shown in FIG. 9. The rear projector 40 has a structure in which the lamp unit 20, an optical unit, a projection lens, a mirror (none of them is illustrated) and the like are stored in the vessel 41. The image that is projected from the projection lens and reflected by the mirror is projected from a rear side of a translucent screen 42, thereby displaying the image.

INDUSTRIAL APPLICABILITY

The present invention can realize high brightness and suppress the generation of the breakage during the life span, and is useful for manufacturing a backlight of an optical device such as a liquid crystal projector, an overhead projector and the like.

The invention claimed is:

1. A method for manufacturing a high-pressure discharge lamp, the high-pressure discharge lamp comprising:
   a substantially spherical portion made of glass forming an internal space that is a light-emitting portion;
   a pair of sealing portions made of glass that are connected respectively with both ends of the substantially spherical portion;
   a pair of electrodes that are sealed into the respective sealing portions at rear end portions so that front ends thereof are positioned in the light-emitting portion, wherein the front ends of the respective electrodes face each other with a predetermined electrode distance in the light-emitting portion; and
   metal foils that are sealed to the respective sealing portions and are connected with the rear ends of the electrodes,
   the method comprising:
   using a vessel provided with a substantially cylindrical glass tube for forming the respective sealing portions on both ends of the substantially spherical portion;
   disposing a connected structure of the metal foil and the electrode in the glass tube such that the front end of the electrode is positioned in the light-emitting portion; and
   melting by heat and shrinking the glass tube for sealing the metal foil and the electrode so as to form the sealing portion,
      wherein an inner diameter $\phi$ of the glass tube before the heat-melt processing and a distance L from an edge of the metal foil to the internal space of the substantially spherical portion are set to satisfy a relationship of $L/\phi \geq 1.35$, a corner of an edge portion of the metal foil on a side of the connection with the electrode is cut so as to form a wedge shape, and then, the sealing step is performed.

2. The method for manufacturing a high-pressure discharge lamp according to claim 1, wherein the metal foil is cut at an angle within a range from 20° to 80° inclusively, with respect to a line perpendicular to an axial bar of a central axis of the electrode that is sealed to the sealing portion.

3. The method for manufacturing a high-pressure discharge lamp according to claim 1, wherein the cutting processing is performed by mechanical cutting or superheat-melt cutting.

4. The method for manufacturing a high-pressure discharge lamp according to claim 1, wherein, after the cutting processing, the cut part is etched or polished.

5. The method for manufacturing a high-pressure discharge lamp according to claim 4, wherein the etching is performed by electrolytic etching in an electrolyte.

6. A high-pressure discharge lamp comprising:
   a substantially spherical portion made of glass forming an internal space that is a light-emitting portion;
   a pair of sealing portions made of glass that are connected respectively with both ends of the substantially spherical portion;
   a pair of electrodes that are sealed into the respective sealing portions at rear end portions so that front ends thereof are positioned in the light-emitting portion, wherein the front ends of the respective electrodes face to each other with a predetermined electrode distance in the light-emitting portion; and
   metal foils with strap shapes that are sealed to the respective sealing portions and are connected with the rear ends of the electrodes, each metal foil has a first edge in a vicinity of the corresponding rear end of the electrode that the metal foil is connected to, a second edge positioned farther away from the rear end of the electrode, and two side edges extending between the first and second edges,
   wherein when viewed from a direction perpendicular to a principal plane of the metal foil, both corners defined between the first edge and the side edges of the metal foil are cut so as to form a curved outline that is concave toward an inside of the strap shape and have no inflection point.

7. The high-pressure discharge lamp according to claim 6, wherein the sealing portion is formed by shrinkage sealing processing.

8. A lamp unit comprising:
   the high-pressure discharge lamp according to claim 6; and
   a reflecting mirror having a concave reflecting surface,
   wherein the high-pressure discharge lamp is attached to the reflecting mirror such that light emitted by the high-pressure discharge lamp is reflect by the reflecting surface.

9. A projection-type image display comprising:
   the high-pressure discharge lamp according to claim 8;
   an optical unit that forms an optical image by modulating illumination light from the high-pressure discharge lamp; and
   a projection apparatus that enlarges and projects the optical image.

* * * * *